US009247606B2

(12) United States Patent
Nagasaka et al.

(10) Patent No.: US 9,247,606 B2
(45) Date of Patent: Jan. 26, 2016

(54) LED ILLUMINATION DIMMING CIRCUIT AND LED ILLUMINATION DIMMING METHOD

(71) Applicant: SHINDENGEN ELECTRIC MANUFACTURING CO., LTD., Tokyo (JP)

(72) Inventors: Toshihiko Nagasaka, Hanno (JP); Katsuya Ikeda, Hanno (JP); Seiichi Takasaka, Hanno (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 159 days.

(21) Appl. No.: 14/007,856

(22) PCT Filed: Feb. 13, 2013

(86) PCT No.: PCT/JP2013/053366
§ 371 (c)(1),
(2) Date: Sep. 26, 2013

(87) PCT Pub. No.: WO2014/125579
PCT Pub. Date: Aug. 21, 2014

(65) Prior Publication Data
US 2015/0216012 A1 Jul. 30, 2015

(51) Int. Cl.
*H05B 37/02* (2006.01)
*H05B 33/08* (2006.01)

(52) U.S. Cl.
CPC ........ *H05B 33/0851* (2013.01); *H05B 33/0815* (2013.01); *H05B 33/0818* (2013.01); *H05B 33/0848* (2013.01); *H05B 37/02* (2013.01); *Y02B 20/46* (2013.01)

(58) Field of Classification Search
CPC . H05B 33/0815; H05B 33/0848; H05B 37/02
USPC ............. 315/209 R, 224, 283, 291, 306, 307, 315/308, 360
See application file for complete search history.

(56) References Cited

U.S. PATENT DOCUMENTS 8,294,379 B2 * 10/2012 Liu et al. ........................ 315/224
8,497,636 B2 *  7/2013 Nerone .......................... 315/210
(Continued)

FOREIGN PATENT DOCUMENTS

JP      2009-123681      6/2009
JP      2011-223800      11/2011
(Continued)

OTHER PUBLICATIONS

International Search Report for PCT/JP2013/053366 mailed on Apr. 24, 2013.
English translation of ISR for corresponding PCT/JP2013/053366 mailed on Apr. 23, 2013.
(Continued)

*Primary Examiner* — Tung X Le
(74) *Attorney, Agent, or Firm* — Ladas & Parry, LLP

(57) ABSTRACT

An LED illumination dimming circuit comprises a capacitor connected to the first output terminal at a first end thereof and to the second output terminal at a second end thereof; a coil connected to the second end of the capacitor at a first end thereof; a switch element connected to a second end of the coil at a first end thereof; a resistor connected to a second end of the switch element at a first end thereof and to the ground terminal at a second end thereof; a diode connected to the power supply terminal at a cathode thereof and to the second end of the coil at an anode thereof; and a controlling circuit that controls an operation of the switch element with a switch controlling signal.

13 Claims, 5 Drawing Sheets

(56) References Cited

U.S. PATENT DOCUMENTS

| | | | | |
|---|---|---|---|---|
| 9,055,623 | B1* | 6/2015 | Bohler | H05B 33/0848 |
| 2012/0038292 | A1* | 2/2012 | Kuo | H05B 33/0818 |
| | | | | 315/297 |
| 2013/0134894 | A1* | 5/2013 | Kuang | 315/224 |
| 2013/0207563 | A1* | 8/2013 | Hamamoto | G05F 1/468 |
| | | | | 315/210 |

FOREIGN PATENT DOCUMENTS

| | | |
|---|---|---|
| JP | 2012-059662 | 3/2012 |
| JP | 2012-221899 | 11/2012 |
| JP | 2012-238755 | 12/2012 |

OTHER PUBLICATIONS

IPRP for related PCT/JP2013/053366 dated Aug. 18, 2015 and its English translation.

* cited by examiner

LED ILLUMINATION DIMMING CIRCUIT AND LED ILLUMINATION DIMMING METHOD

CROSS-REFERENCE TO RELATED APPLICATION

This application is the national stage of International Patent Application no. PCT/JP2013/053366, filed on Feb. 13, 2013, the disclosure of which is incorporated herein in its entirety.

TECHNICAL FIELD

The present invention relates to an LED illumination dimming circuit and an LED illumination dimming method.

BACKGROUND ART

There is an LED illumination dimming circuit 100A that controls dimming of an LED element, such as those described in Japanese Patent Laid-Open Nos. 2009-123681 and 2012-59662 (FIG. 5).

The LED illumination dimming circuit 100A includes a resistor "R1", a bipolar transistor "Q1" having a collector connected to a cathode of an LED element 4 having an anode connected to a power supply 2, a constant current circuit 6 connected between an emitter of a bipolar transistor "Q1" and a ground, and a microcomputer 5 that controls the bipolar transistor "Q1" and the constant current circuit 6 in response to a dimming signal output from a dimmer 1 (FIG. 5).

In a constant current control in a current critical mode, the LED illumination dimming circuit 100A controls the bipolar transistor "Q1" to lower a peak current to achieve dimming (linear dimming).

However, in the constant current control in the current critical mode, if the conventional LED illumination dimming circuit 100A described above lowers the peak current to achieve dimming (linear dimming), the switching frequency of the bipolar transistor "Q1" increases.

The increase of the switching frequency poses various problems, such as an increase of noise and a decrease of the efficiency.

The switching frequency may be lowered when dimming is not performed. However, the switching frequency cannot be lowered below an audio frequency, so that the actual dimming range is limited.

In addition, if the switching frequency is lowered when dimming is not performed, the size of components, such as a transformer, undesirably increases.

Furthermore, the conventional LED illumination dimming circuit 100A described above needs to have a signal terminal for receiving a signal that prescribes an on width in which the bipolar transistor "Q1" is turned on and a signal terminal for receiving a signal that prescribes an off width in which the bipolar transistor "Q1" is turned off.

That is, the conventional LED illumination dimming circuit 100A described above needs to have a plurality of terminals.

DISCLOSURE OF THE INVENTION

An LED illumination dimming circuit according to an embodiment of an aspect of the present invention is an LED illumination dimming circuit that controls dimming of an LED element, comprising:

a power supply terminal to which a power supply voltage is supplied;

a ground terminal connected to a ground;

a first output terminal that is connected to the power supply terminal and to which an anode side of the LED element is connected;

a second output terminal to which a cathode side of the LED element is connected;

a capacitor connected to the first output terminal at a first end thereof and to the second output terminal at a second end thereof;

a coil connected to the second end of the capacitor at a first end thereof;

a switch element connected to a second end of the coil at a first end thereof;

a resistor connected to a second end of the switch element at a first end thereof and to the ground terminal at a second end thereof;

a diode connected to the power supply terminal at a cathode thereof and to the second end of the coil at an anode thereof; and a controlling circuit that controls an operation of the switch element with a switch controlling signal depending on a dimming signal that indicates a dimming rate of the LED element, a detection voltage responsive to a voltage drop in the resistor and a detection current flowing through the coil, wherein the controlling circuit fixes a switching period, which consists of an on period in which the switch element is turned on and an off period in which the switch element is turned off, in a first mode in which the dimming signal indicates a first dimming rate, reduces the switching period while maintaining a ratio between the on period and the off period when the dimming rate indicated by the dimming signal decreases in a second mode in which the dimming signal indicates a dimming rate in a first dimming section from the first dimming rate to a second dimming rate lower than the first dimming rate, reduces the on period while keeping the off period fixed when the dimming rate indicated by the dimming signal decreases in a third mode in which the dimming signal indicates a dimming rate in a second dimming section from the second dimming rate to a third dimming rate lower than the second dimming rate, increases the off period while reducing the on period when the dimming rate indicated by the dimming signal decreases in a fourth mode in which the dimming signal indicates a dimming rate in a third dimming section from the third dimming rate to a fourth dimming rate lower than the third dimming rate, fixes the on period and fixes the off period at a period that is longer than the off period in the fourth mode in a fifth mode in which the dimming signal indicates the fourth dimming rate, determines that a control mode of the LED illumination dimming circuit is the first mode if a value of the dimming signal is equal to or higher than a first threshold, and determines that the control mode is the second mode if the value of the dimming signal is equal to or higher than a second threshold lower than the first threshold and is lower than the first threshold.

In the LED illumination dimming circuit, wherein in the first mode, the controlling circuit turns off the switch element when the detection voltage increases to reach a preset comparative voltage as a result of turning on of the switch element and then turns on the switch element when a current flowing through the coil decreases to zero as a result of the turning off of the switch element.

In the LED illumination dimming circuit,
wherein in the second mode, the controlling circuit
turns off the switch element when the detection voltage increases to reach a divided voltage value obtained by voltage-dividing the dimming signal as a result of turning on of the switch element and then turns on the switch element when a current flowing through the coil decreases to zero as a result of the turning off of the switch element.

In the LED illumination dimming circuit,
wherein in the third mode, the controlling circuit
turns off the switch element when the detection voltage increases to reach a divided voltage value obtained by voltage-dividing the dimming signal as a result of turning on of the switch element and then turns on the switch element when an off-width fixing period elapses after the turning off of the switch element.

In the LED illumination dimming circuit,
wherein in the fourth mode, the controlling circuit
turns off the switch element when the detection voltage increases to reach a divided voltage value obtained by voltage-dividing the dimming signal as a result of turning on of the switch element and then turns on the switch element when a first off-width modulation period, which varies with the value of the dimming signal and is longer than the off-width fixing period, elapses after the turning off of the switch element.

In the LED illumination dimming circuit,
wherein in the fifth mode, the controlling circuit
turns off the switch element when the detection voltage increases to reach a divided voltage value obtained by voltage-dividing the dimming signal as a result of turning on of the switch element and then turns on the switch element when a second off-width modulation period, which is longer than the first off-width modulation period, elapses after the turning off of the switch element.

In the LED illumination dimming circuit,
wherein in the second mode, the controlling circuit
increases the switching period while maintaining the ratio between the on period and the off period when the dimming rate indicated by the dimming signal increases.

In the LED illumination dimming circuit,
wherein in the third mode, the controlling circuit
increases the on period while keeping the off period fixed when the dimming rate indicated by the dimming signal increases.

In the LED illumination dimming circuit,
wherein in the fourth mode, the controlling circuit
reduces the off period while increasing the on period when the dimming rate indicated by the dimming signal increases.

In the LED illumination dimming circuit,
wherein the controlling circuit comprises:
a signal input terminal to which the dimming signal is input;
a constant current source having a first end to which an internal power supply voltage is supplied;
an input diode connected to a second end of the constant current source at an anode thereof and to the signal input terminal at a cathode thereof;
a first voltage-dividing resistor connected to the signal input terminal at a first end thereof;
a second voltage-dividing resistor connected to a second end of the first voltage-dividing resistor at a first end thereof and to the ground at a second end thereof;
a three-input comparator that has a non-inverting input terminal that is connected to the first end of the resistor and to which the detection voltage is input, a first inverting input terminal that is connected to the second end of the first voltage-dividing resistor and to which a divided voltage value obtained by voltage-dividing the dimming signal is input and a second inverting input terminal to which a comparative voltage is input, outputs a signal responsive to a result of comparison between the comparative voltage and the detection voltage if the divided voltage value is equal to or higher than the comparative voltage and outputs a signal responsive to a result of comparison between the divided voltage value and the detection voltage if the divided voltage value is lower than the comparative voltage;
an off-timing detecting circuit that outputs an impulse-like off signal when it is detected based on the signal output from the three-input comparator that the detection voltage reaches the comparative voltage or the divided voltage value;
an on-timing detecting circuit that is connected to the second end of the coil at an input thereof and outputs an impulse-like on signal when a current flowing through the coil becomes zero;
a first pulse generating circuit that receives the off signal and the on signal and outputs a first pulse signal that rises at a timing of the on signal and falls at a timing of the off signal;
a second pulse generating circuit that outputs a second pulse signal based on the value of the dimming signal; and
an AND circuit that performs an AND operation of the first pulse signal and the second pulse signal and outputs a result of the operation as the switch controlling signal, and
the second pulse generating circuit
fixes a pulse width and a pulse interval of the second pulse signal if the value of the dimming signal is equal to or higher than the first threshold,
reduces the pulse width and fixes the pulse interval according to the decrease of the value of the dimming signal if the value of the dimming signal is lower than the first threshold and equal to or higher than a third threshold,
reduces the pulse width and increases the pulse interval according to the decrease of the value of the dimming signal if the value of the dimming signal is lower than the third threshold and equal to or higher than a fourth threshold, and
fixes the pulse width and increases the pulse interval according to the decrease of the value of the dimming signal if the value of the dimming signal is lower than the fourth threshold.

In the LED illumination dimming circuit,
wherein a switching frequency that is an inverse of the switching period associated with the first dimming rate in the first mode is higher than an audio frequency.

In the LED illumination dimming circuit,
wherein a switching frequency that is an inverse of the switching period associated with the fourth dimming rate in the fifth mode is lower than the switching frequency that is the inverse of the switching period associated with the first dimming rate in the first mode.

An LED illumination dimming method according to an embodiment of an aspect of the present invention is a LED illumination dimming method by a LED illumination dimming circuit that comprises a power supply terminal to which a power supply voltage is supplied; a ground terminal connected to a ground; a first output terminal that is connected to the power supply terminal and to which an anode side of the LED element is connected; a second output terminal to which a cathode side of the LED element is connected; a capacitor connected to the first output terminal at a first end thereof and to the second output terminal at a second end thereof; a coil connected to the second end of the capacitor at a first end thereof; a switch element connected to a second end of the coil at a first end thereof; a resistor connected to a second end of the switch element at a first end thereof and to the ground terminal at a second end thereof; a diode connected to the power supply terminal at a cathode thereof and to the second end of the coil at an anode thereof; and a controlling circuit that controls an operation of the switch element with a switch controlling signal depending on a dimming signal that indicates a dimming rate of the LED element, a detection voltage responsive to a voltage drop in the resistor and a detection current flowing through the coil, wherein the controlling circuit fixes a switching period, which consists of an on period in which the switch element is turned on and an off period in which the switch element is turned off, in a first mode in which the dimming signal indicates a first dimming rate, reduces the switching period while maintaining a ratio between the on period and the off period when the dimming rate indicated by the dimming signal decreases in a second mode in which the dimming signal indicates a dimming rate in a first dimming section from the first dimming rate to a second dimming rate lower than the first dimming rate, reduces the on period while keeping the off period fixed when the dimming rate indicated by the dimming signal decreases in a third mode in which the dimming signal indicates a dimming rate in a second dimming section from the second dimming rate to a third dimming rate lower than the second dimming rate, increases the off period while reducing the on period when the dimming rate indicated by the dimming signal decreases in a fourth mode in which the dimming signal indicates a dimming rate in a third dimming section from the third dimming rate to a fourth dimming rate lower than the third dimming rate, fixes the on period and fixes the off period at a period that is longer than the off period in the fourth mode in a fifth mode in which the dimming signal indicates the fourth dimming rate, determines that a control mode of the LED illumination dimming circuit is the first mode if a value of the dimming signal is equal to or higher than a first threshold, and determines that the control mode is the second mode if the value of the dimming signal is equal to or higher than a second threshold lower than the first threshold and is lower than the first threshold.

The LED illumination dimming circuit according to the present invention provides the maximum dimming range in a limited frequency range by modulating the off width of the switch element so as to prevent the switching frequency from being too high during dimming.

The LED illumination dimming circuit achieves dimming in the five modes. More specifically, the LED illumination dimming circuit achieves dimming by successively performing the five modes, the maximum current mode in which the LED element is made to emit light with the maximum current, the frequency modulation mode in which dimming is achieved by decreasing the peak current, the off-width fixing mode in which the only the on width is reduced while keeping the off width fixed, the off-width modulation mode in which the on width is reduced while increasing the off width, and the minimum current mode in which the LED element is made to emit light with the minimum current.

In this way, the frequency change range can be reduced by reducing the on width of the switch element and at the same time increasing the off width of the switch element.

When the switching frequency is close to the audio frequency because of the control to reduce the switching frequency when the dimming rate is low (when the light is dark), the current (energy) is at the minimum.

Therefore, a sound caused by switching of the switch element in the LED illumination dimming circuit is less audible to the user.

To the contrary, according to the prior art, the switching frequency is close to the audio frequency when the current (energy) is at the maximum, so that a sound caused by switching of the switch element in the LED illumination dimming circuit is audible to the user.

In this way, the LED illumination dimming circuit according to the present invention can provide a wide dimming range with a narrow frequency change range.

In particular, the LED illumination dimming circuit according to the present invention can reduce the frequency change while taking advantage of the current critical mode in which the efficiency is high and noise is low.

Furthermore, the LED illumination dimming circuit according to the present invention uses the dimming signal input thereto via one signal input terminal to achieve dimming control and therefore requires a reduced number of terminals to achieve dimming control.

BEST MODE FOR CARRYING OUT THE INVENTION

In the following, an embodiment of the present invention will be described with reference to the drawings.

First Embodiment

Figure 1:
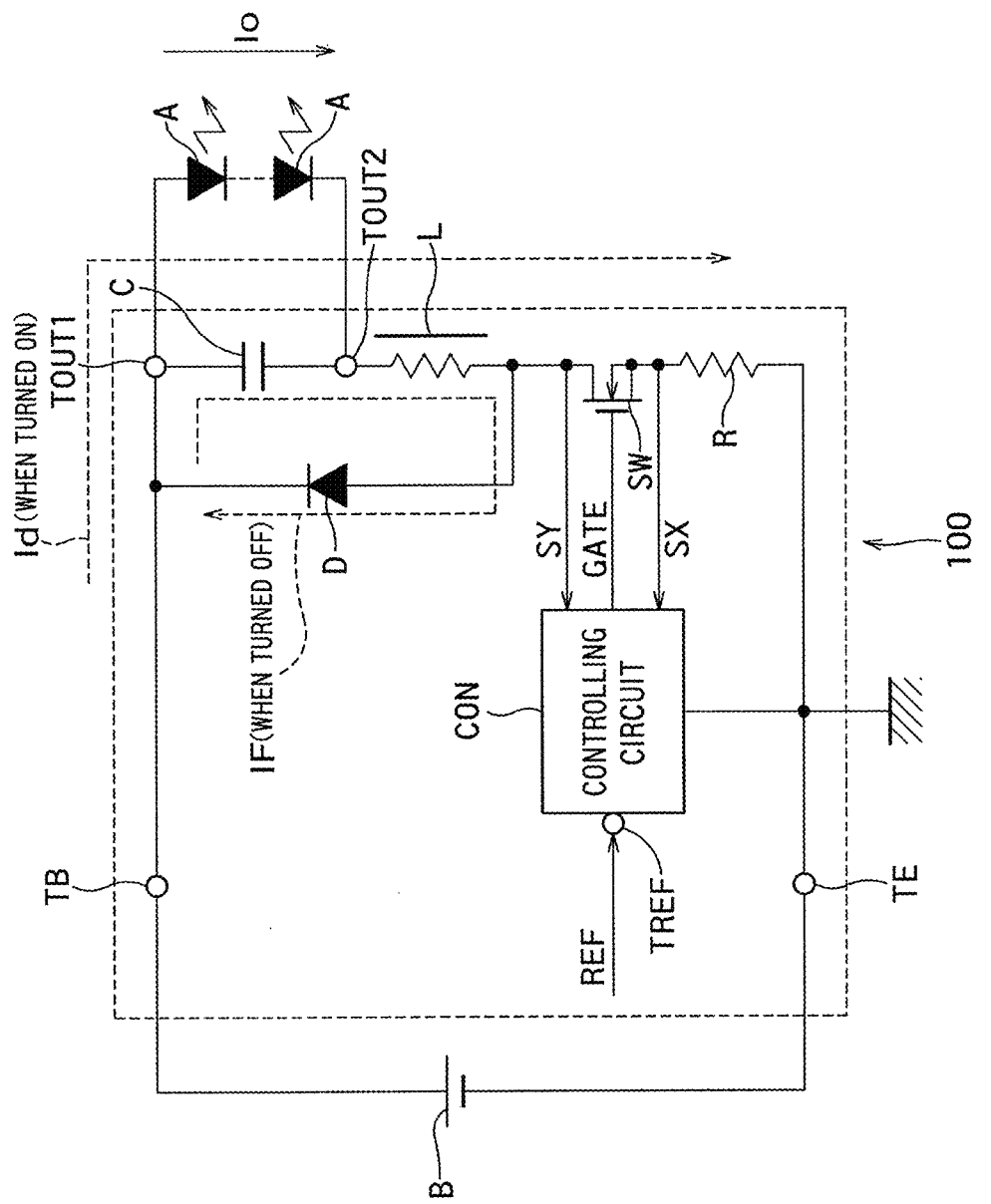
FIG. 1 is a diagram showing an example of a configuration of an LED illumination dimming circuit 100 according to a first embodiment, which is an aspect of the present invention.
Figure 2:
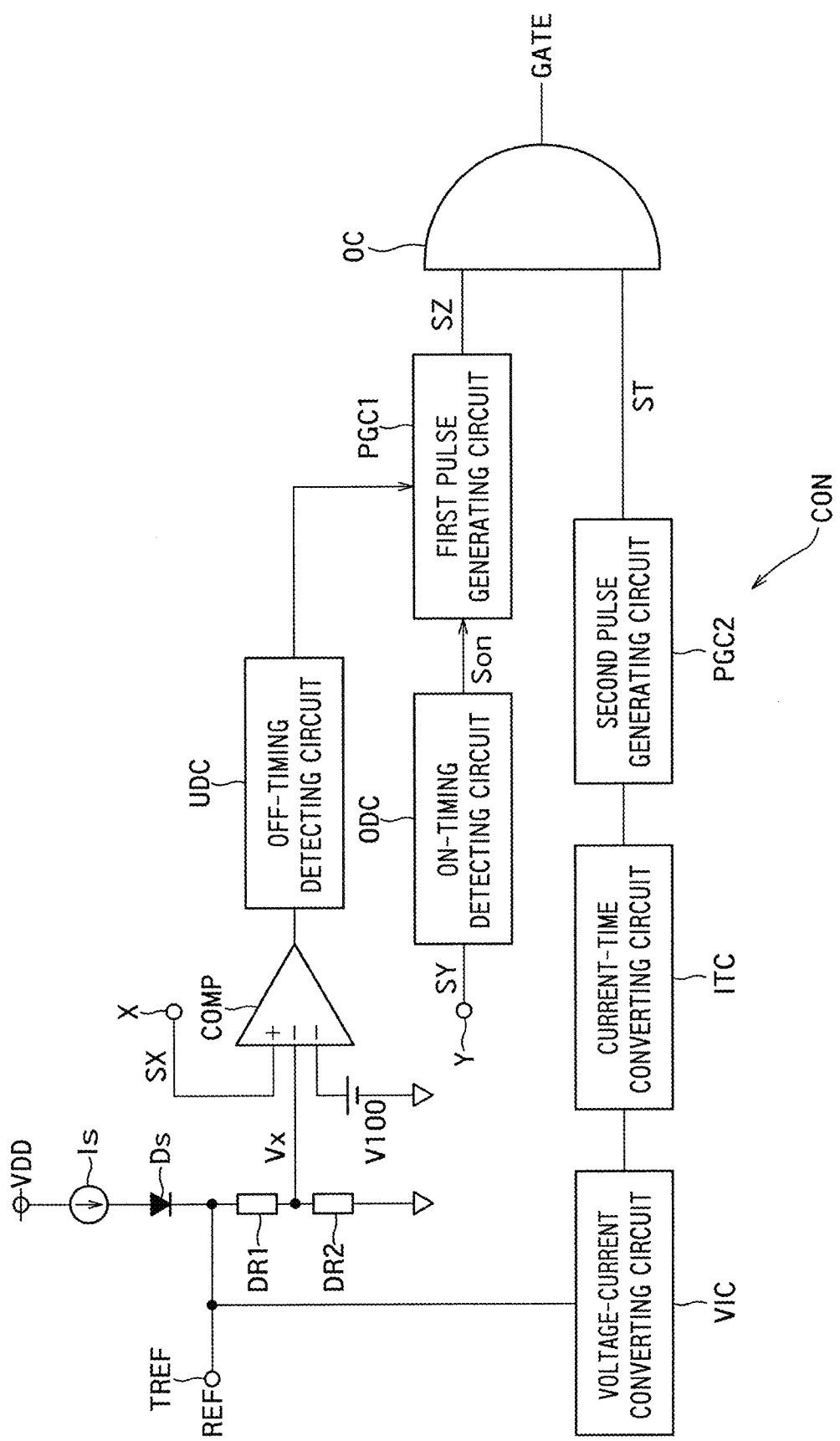
FIG. 2 is a block diagram showing an example of a configuration of a controlling circuit "CON" shown in FIG. 1.
Figure 3:
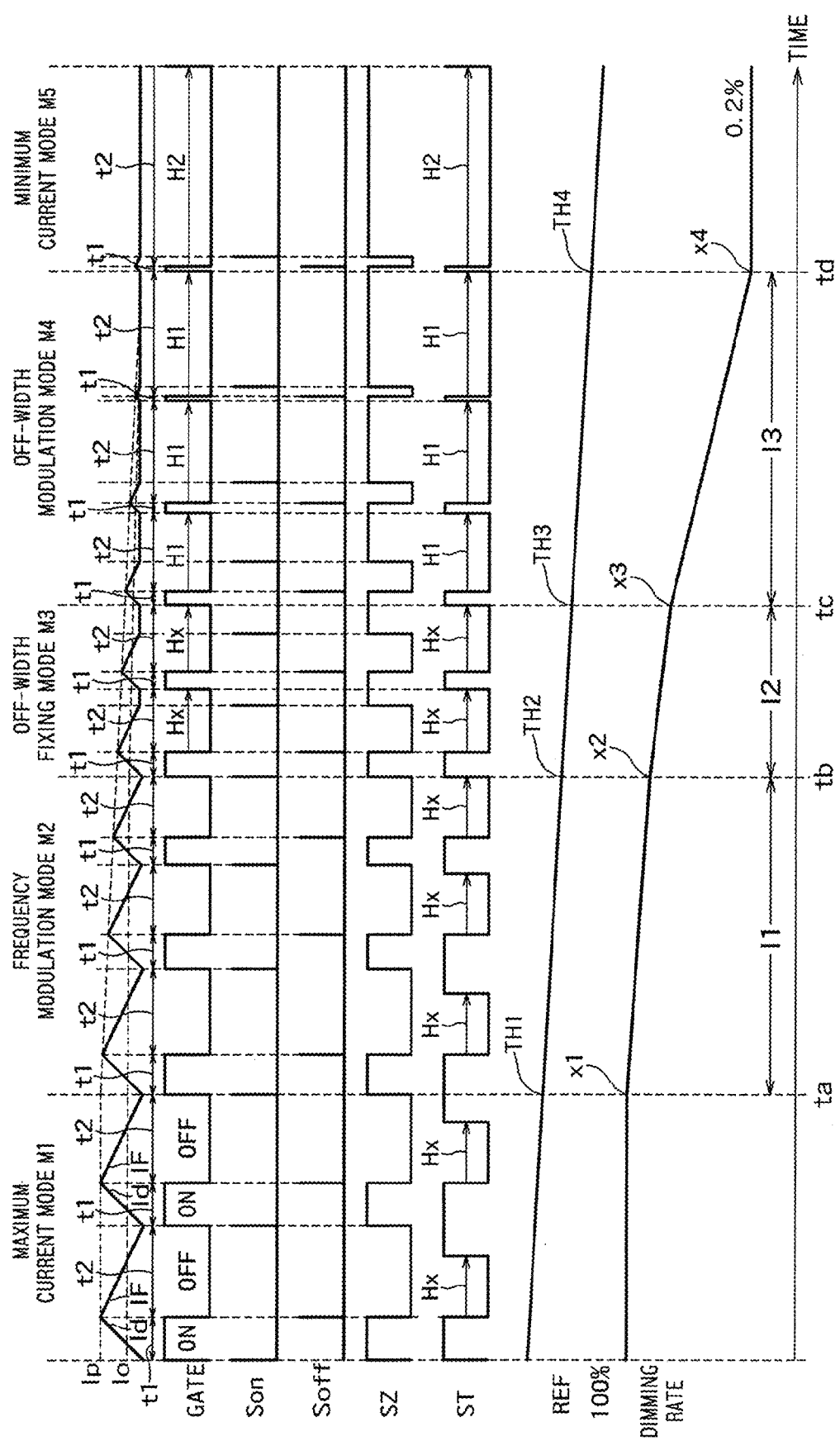
FIG. 3 is a diagram showing an example of an operating waveform in each mode of the LED illumination dimming circuit 100 shown in FIG. 1.

FIG. 1 is a diagram showing an example of a configuration of an LED illumination dimming circuit 100 according to a first embodiment, which is an aspect of the present invention. FIG. 2 is a block diagram showing an example of a configuration of a controlling circuit "CON" shown in FIG. 1. FIG. 3 is a diagram showing an example of an operating waveform in each mode of the LED illumination dimming circuit 100 shown in FIG. 1. In FIG. 3, "Ip" denotes a peak value of an output current "Io" flowing between a first output terminal "TOUT1" and a second output terminal "TOUT2".

As shown in FIG. 1, the LED illumination dimming circuit 100 includes a power supply terminal "TB", a ground terminal "TE", the first output terminal "TOUT1", the second output terminal "TOUT2", a capacitor "C", a coil "L", a resistor "R", a switch element "SW" and the controlling circuit "CON".

The power supply terminal "TB" is configured to receive a power supply voltage. A positive pole of a battery (a power supply) "B" is connected to the power supply terminal "TB".

The ground terminal "TE" is configured to be connected to a ground. A negative pole of the battery (the power supply) "B" is connected to the ground terminal "TE".

The first output terminal "TOUT1" is connected to the power supply terminal "TB", and an anode side of an LED element "A" is connected to the first output terminal "TOUT1".

A cathode side of the LED element "A" is connected to the second output terminal "TOUT2".

The capacitor "C" is connected to the first output terminal "TOUT1" at one end thereof and to the second output terminal "TOUT2" at another end thereof.

The coil "L" is connected to the another end of the capacitor "C" at one end thereof.

The switch element "SW" is connected to another end of the coil "L" at one end thereof.

The resistor "R" is connected to another end of the switch element "SW" at one end thereof and to the ground terminal "TE" at another end thereof.

The diode "D" is connected to the power supply terminal "TB" at a cathode thereof and to the another end of the coil "L" at an anode thereof.

The controlling circuit "CON" is configured to control an operation of the switch element "SW" with a switch controlling signal "GATE" depending on a dimming signal "REF" that indicates a dimming rate of the LED element "A", a detection voltage "SX" (the resistance of the resistor "R" times the value of a current "Id") responsive to a voltage drop in the resistor "R" and a detection current flowing through the coil "L".

Note that the switch element "SW" is an MOS transistor (an nMOS transistor in the example shown in FIG. 1) that is connected to the another end of the coil "L" at one end thereof and to the one end of the resistor "R" at another end thereof and receives the switch controlling signal "GATE" at a gate thereof, for example.

For example, when the switch element "SW" is turned on by the switch controlling signal "GATE" (at a "High" level), the current "Id" flows. On the other hand, when the switch element "SW" is turned off by the switch controlling signal "GATE" (at a "Low" level), a current "IF" flows.

As shown in FIG. 2, the controlling circuit "CON" includes a signal input terminal "TREF", a constant current source "IS", an input diode "DS", a first voltage dividing resistor "DR1", a second voltage dividing resistor "DR2", a three-input comparator "COMP", an off-timing detecting circuit "UDO", an on-timing detecting circuit "ODC", a first pulse generating circuit "PGC1", a second pulse generating circuit "PGC2", a voltage-current converting circuit "VIC", a current-time converting circuit "ITC" and an AND circuit "OC".

The signal input terminal "TREF" is configured to receive the dimming signal "REF".

The constant current source "IS" is configured to receive an internal power supply voltage "VDD" at one end thereof and output a constant current.

The input diode "DS" is connected to another end of the constant current source "IS" at an anode thereof and to the signal input terminal "TREF" at a cathode thereof.

The first voltage dividing resistor "DR1" is connected to the signal input terminal "TREF" at one end thereof.

The second voltage dividing resistor "DR2" is connected to another end of the first voltage dividing resistor "DR1" at one end thereof and to the ground at another end thereof.

The three-input comparator "COMP" has a non-inverting input terminal that is connected to the one end of the resistor "R" (a first node "X") and receives the detection voltage "SX", a first inverting input terminal that is connected to the another end of the first voltage dividing resistor "DR1" and receives a divided voltage value "Vx" obtained by voltage-dividing the dimming signal "REF", and a second inverting input terminal that receives a comparative voltage "V100".

If the divided voltage value "Vx" is equal to or higher than the comparative voltage "V100", the three-input comparator "COMP" is configured to output a signal responsive to a result of comparison between the comparative voltage "V100" and the detection voltage "SX".

On the other hand, if the divided voltage value "Vx" is lower than the comparative voltage "V100", the three-input comparator "COMP" is configured to output a signal responsive to a result of comparison between the divided voltage value "Vx" and the detection voltage "SX".

The off-timing detecting circuit "UDO" is configured to output an impulse-like off signal "Soff" (FIG. 3) when it is detected based on the signal output from the three-input comparator "COMP" that the detection voltage "SX" reaches the comparative voltage "V100" or the divided voltage value "Vx".

The on-timing detecting circuit "ODC" is connected to the another end of the coil "L" (a second node "Y") at an input thereof and is configured to output an impulse-like on signal "Son" (FIG. 3) when the current flowing through the coil "L" becomes zero.

The first pulse generating circuit "PGC1" is configured to receive the off signal "Soff" and the on signal "Son" and output a first pulse signal "SZ" (FIG. 3) that rises at the timing of the on signal "Son" and falls at the timing of the off signal "Soff".

The voltage-current converting circuit "VIC" is configured to converts a value of the dimming signal "REF" from voltage to current and output the resulting current value.

The current-time converting circuit "ITC" is configured to convert the current value from current to time and output the resulting time value.

The second pulse generating circuit "PGC2" is configured to output a second pulse signal "ST" based on the resulting time value.

As described above, the time described above is based on the current value described above, and the current value is based on the value of the dimming signal "REF". That is, the second pulse generating circuit "PGC2" is configured to output the second pulse signal "ST" based on the value of the dimming signal "REF".

For example, if the value of the dimming signal "REF" is equal to or higher than a first threshold "TH1", the second pulse generating circuit "PGC2" fixes a pulse width and a pulse interval of the second pulse signal "ST".

If the value of the dimming signal "REF" is lower than the first threshold "TH1" and equal to or higher than a third threshold "TH3", the second pulse generating circuit "PGC2" reduces the pulse width of the second pulse signal "ST" according to the decrease of the value of the dimming signal "REF" and fixes the pulse interval.

If the value of the dimming signal "REF" is lower than the third threshold "TH3" and equal to or higher than a fourth threshold "TH4", the second pulse generating circuit "PGC2" reduces the pulse width of the second pulse signal "ST" according to the decrease of the value of the dimming signal "REF" and increases the pulse interval.

If the value of the dimming signal "REF" is lower than the fourth threshold "TH4", the second pulse generating circuit "PGC2" fixed the pulse width and increases the pulse interval of the second pulse signal "ST" according to the decrease of the value of the dimming signal "REF".

The AND circuit "OC" is configured to perform an AND operation of the first pulse signal "SZ" and the second pulse signal "ST" and output the operation result as the switch controlling signal "GATE" (FIG. 3).

In a first mode (a maximum current mode) "M1" in which the dimming signal "REF" indicates a first dimming rate "x1" (before a time "ta" in FIG. 3), for example, the controlling circuit "CON" is configured to fix a switching period, which consists of an on period "t1" in which the switch element "SW" is turned on and an off period "t2" in which the switch element "SW" is turned off.

In the first mode "M1", if the switch element "SW" is turned on, and the detection voltage "SX" (the resistance of the resistor "R" times the value of the current "Id") increases to reach the preset comparative voltage "V100", for example, the controlling circuit "CON" turns off the switch element "SW" and then turns on the switch element "SW" when the current "IF" flowing through the coil "L" decreases to zero as a result of the turning off of the switch element "SW". In this way, the switching period in the first mode "M1" described above is controlled.

Note that a switching frequency, which is an inverse of the switching period associated with the first dimming rate "x1" in the first mode "M1", is set to be higher than the audio frequency.

The first dimming rate "x1" is 100%, for example.

The controlling circuit "CON" is configured to determine that the control mode of the LED illumination dimming circuit is the first mode "M1" if the value of the dimming signal "REF" is equal to or higher than the first threshold "TH1" (FIG. 3).

In a second mode (a frequency modulation mode) "M2" in which the dimming signal "REF" indicates a dimming rate in a first dimming section "I1" ranging from the first dimming rate "x1" to a second dimming rate "x2" lower than the first dimming rate "x1" (from the time "ta" to a time "tb" in FIG. 3), if the dimming rate indicated by the dimming signal "REF" decreases, the controlling circuit "CON" is configured to reduce the switching period while maintaining the ratio between the on period "t1" and the off period "t2"

On the other hand, in the second mode "M2", if the dimming rate indicated by the dimming signal "REF" increases, the controlling circuit "CON" is configured to increase the switching period while maintaining the ratio between the on period "t1" and the off period "t2".

In the second mode "M2", if the switch element "SW" is turned on, and the detection voltage "SX" (the resistance of the resistor "R" times the value of the current "Id") increases to reach the divided voltage value "Vx" obtained by voltage-dividing the dimming signal "REF", for example, the controlling circuit "CON" turns off the switch element "SW" and then turns on the switch element "SW" when the current "IF" flowing through the coil "L" decreases to zero as a result of the turning off of the switch element "SW" (FIG. 3). In this way, the switching period in the second mode "M2" described above is controlled.

Note that in transition from the first mode "M1" to the second mode "M2", the controlling circuit "CON" is configured to reduce the switching period while maintaining the ratio between the on period "t1" and the off period "t2".

On the other hand, in transition from the second mode "M2" to the first mode "M1", the controlling circuit "CON" is configured to increase the switching period while maintaining the ratio between the on period "t1" and the off period "t2".

The controlling circuit "CON" is configured to determine that the control mode is the second mode if the value of the dimming signal "REF" is equal to or higher than a second threshold "TH2" lower than the first threshold "TH1" and is lower than the first threshold "TH1" (FIG. 3).

In a third mode (an off-width fixing mode) "M3" in which the dimming signal "REF" indicates a dimming rate in a second dimming section "I2" ranging from the second dimming rate "x2" to a third dimming rate "x3" lower than the second dimming rate "x2" (from the time "tb" to a time "tc" in FIG. 3), if the dimming rate indicated by the dimming signal "REF" decreases, the controlling circuit "CON" is configured to reduce the on period "t1" while keeping off period "t2" fixed.

On the other hand, in the third mode "M3", if the dimming rate indicated by the dimming signal "REF" increases, the controlling circuit "CON" is configured to increase the on period "t1" while keeping the off period "t2" fixed.

In the third mode "M3", if the switch element "SW" is turned on, and the detection voltage "SX" (the resistance of the resistor "R" times the value of the current "Id") increases to reach the divided voltage value "Vx" obtained by voltage-dividing the dimming signal "REF", for example, the controlling circuit "CON" turns off the switch element "SW" and then turns on the switch element "SW" when an off-width fixing period "Hx" elapses after the turning off of the switch element "SW" (FIG. 3). In this way, the switching period in the third mode "M3" described above is controlled.

Note that in transition from the second mode "M2" to the third mode "M3", the controlling circuit "CON" is configured to reduce the on period "t1" while keeping the off period "t2" fixed.

On the other hand, in transition from the third mode "M3" to the second mode "M2", the controlling circuit "CON" is configured to increase the on period "t1" while keeping the off period "t2" fixed.

In a fourth mode (an off-width modulation mode) "M4" in which the dimming signal "REF" indicates a dimming rate in a third dimming section "I3" ranging from the third dimming rate "x3" to a fourth dimming rate "x4" lower than the third dimming rate "x3" (from the time "tc" to a time "td" in FIG. 3), if the dimming rate indicated by the dimming signal "REF" decreases, the controlling circuit "CON" is configured to increase the off period "t2" while reducing the on period "t1".

On the other hand, in the fourth mode "M4", if the dimming rate indicated by the dimming signal "REF" increases, the controlling circuit "CON" is configured to reduce the off period "t2" while increasing the on period "t1".

In the fourth mode "M4", if the switch element "SW" is turned on, and the detection voltage "SX" (the resistance of the resistor "R" times the value of the current "Id") increases to reach the divided voltage value "Vx" obtained by voltage-dividing the dimming signal "REF", for example, the controlling circuit "CON" turns off the switch element "SW" and then turns on the switch element "SW" when a first off-width modulation period "H1", which varies with the value of the dimming signal "REF" and is longer than the off-width fixing period "Hx", elapses after the turning off of the switch element "SW". In this way, the switching period in the fourth mode "M4" described above is controlled.

Note that the first off-width modulation period "H1" decreases as the value of the dimming signal "REF" increases and increases as the value of the dimming signal "REF" decreases.

Note that in transition from the third mode "M3" to the fourth mode "M4", the controlling circuit "CON" is configured to increase the off period "t2" while reducing the on period "t1".

On the other hand, in transition from the fourth mode "M4" to the third mode "M3", the controlling circuit "CON" is configured to reduce the off period "t2" while increasing the on period "t1".

Note that the fourth dimming rate "x4" is a value ranging from 0% to 1% (0.2% in the example shown in FIG. 3), for example.

In a fifth mode (a minimum current mode) "M5" in which the dimming signal "REF" indicates the fourth dimming rate "x4" (after the time "td" in FIG. 3), the controlling circuit "CON" is configured to fix the on period "t1" and fix the off period "t2" at a period that is longer than the off period "t2" in the fourth mode "M4".

In the fifth mode, if the switch element "SW" is turned on, and the detection voltage "SX" (the resistance of the resistor "R" times the value of the current "Id") increases to reach the divided voltage value "Vx" obtained by voltage-dividing the dimming signal "REF", for example, the controlling circuit "CON" turns off the switch element "SW" and then turns on the switch element "SW" when a second off-width modulation period "H2" longer than the first off-width modulation period "H1" elapses after the turning off of the switch element "SW" (FIG. 3). In this way, the switching period in the fifth mode "M5" described above is controlled.

Note that in transition from the fourth mode "M4" to the fifth mode "M5", the controlling circuit "CON" is configured to set the off period "t2" longer than the off period "t2" in the fourth mode "M4" while maintaining the on period "t1".

On the other hand, in transition from the fifth mode "M5" to the fourth mode "M4", the controlling circuit "CON" is configured to set the off period "t2" shorter than the off period "t2" in the fifth mode "M5" while maintaining the on period "t1".

As described above, the LED illumination dimming circuit 100 is configured to control dimming of the LED element "A" in response to the dimming signal "REF". Note that the dimming signal "REF" is output from a microcomputer (not shown) in response to a manipulation by a user, for example.

Next, an example of an operation of the LED illumination dimming circuit 100 configured as described above will be described with reference to FIG. 3.

For example, before the time "ta" in FIG. 3, the controlling circuit "CON" sets the first mode (maximum current mode) "M1" as the control mode. As described above, if the value of the dimming signal "REF" is equal to or higher than the first threshold "TH1", the controlling circuit "CON" determines that the control mode of the LED illumination dimming circuit is the first mode "M1".

The controlling circuit "CON" then fixes the switching period, which consists of the on period "t1" in which the switch element "SW" is turned on and the off period "t2" in which the switch element "SW" is turned off.

For example, as described above, if the switch element "SW" is turned on, and the detection voltage "SX" (the resistance of the resistor "R" times the value of the current "Id") increases to reach the preset comparative voltage "V100", the controlling circuit "CON" turns off the switch element "SW" and then turns on the switch element "SW" when the current "IF" flowing through the coil "L" decreases to zero as a result of the turning off of the switch element "SW".

In transition from the first mode "M1" to the second mode "M2" (at the time "ta"), the controlling circuit "CON" reduces the switching period while maintaining the ratio between the on period "t1" and the off period "t2".

In the period from the time "ta" to the time "tb" in FIG. 3, the controlling circuit "CON" sets the second mode (frequency modulation mode) "M2" as the control mode. As described above, if the value of the dimming signal "REF" is equal to or higher than the second threshold "TH2" lower than the first threshold "TH1" and is lower than the first threshold "TH1", the controlling circuit "CON" determines that the control mode is the second mode.

If the dimming rate indicated by the dimming signal "REF" decreases, the controlling circuit "CON" reduces the switching period while maintaining the ratio between the on period "t1" and the off period "t2".

For example, as described above, if the switch element "SW" is turned on, and the detection voltage "SX" (the resistance of the resistor "R" times the value of the current "Id") increases to reach the divided voltage value "Vx" obtained by voltage-dividing the dimming signal "REF", the controlling circuit "CON" turns off the switch element "SW" and then turns on the switch element "SW" when the current "IF" flowing through the coil "L" decreases to zero as a result of the turning off of the switch element "SW".

As described above, in the second mode "M2", if the dimming rate indicated by the dimming signal "REF" increase, the controlling circuit "CON" increases the switching period while maintaining the ratio between the on period "t1" and the off period "t2".

As described above, in transition from the second mode "M2" to the first mode "M1", the controlling circuit "CON" increases the switching period while maintaining the ratio between the on period "t1" and the off period "t2".

In transition from the second mode "M2" to the third mode "M3" (at the time "tb"), the controlling circuit "CON" reduces the on period "t1" while keeping the off period "t2" fixed.

In the period from the time "tb" to the time "tc" in FIG. 3, if the dimming rate indicated by the dimming signal "REF" decreases, the controlling circuit "CON" reduces the on period "t1" while keeping the off period "t2" fixed (the third mode (the off-width fixing mode) "M3").

For example, as described above, if the switch element "SW" is turned on, and the detection voltage "SX" (the resistance of the resistor "R" times the value of the current "Id") increases to reach the divided voltage value "Vx" obtained by voltage-dividing the dimming signal "REF", the controlling circuit "CON" turns off the switch element "SW" and then turns on the switch element "SW" when the off-width fixing period "Hx" elapses after the turning off of the switch element "SW".

As described above, in the third mode "M3", if the dimming rate indicated by the dimming signal "REF" increases, the controlling circuit "CON" increases the on period "t1" while keeping the off period "t2" fixed.

As described above, in transition from the third mode "M3" to the second mode "M2", the controlling circuit "CON" is configured to increase the on period "t1" while keeping the off period "t2" fixed.

In transition from the third mode "M3" to the fourth mode "M4" (at the time "tc"), the controlling circuit "CON" increases the off period "t2" while reducing the on period "t1".

In the period from the time "tc" to the time "td" in FIG. 3, if the dimming rate indicated by the dimming signal "REF" decreases, the controlling circuit "CON" increases the off period "t2" while reducing the on period "t1" (the fourth mode (the off-width modulation mode) "M4").

For example, as described above, if the switch element "SW" is turned on, and the detection voltage "SX" (the resistance of the resistor "R" times the value of the current "Id") increases to reach the divided voltage value "Vx" obtained by voltage-dividing the dimming signal "REF", the controlling circuit "CON" turns off the switch element "SW" and then turns on the switch element "SW" when the first off-width modulation period "H1", which is longer than the off-width fixing period "Hx" and varies with the value of the dimming signal "REF", elapses after the turning off of the switch element "SW".

As described above, in the fourth mode "M4", if the dimming rate indicated by the dimming signal "REF" increases, the controlling circuit "CON" reduces the off period "t2" while increasing the on period "t1".

As described above, in transition from the fourth mode "M4" to the third mode "M3", the controlling circuit "CON" reduces the off period "t2" while increasing the on period "t1".

In transition from the fourth mode "M4" to the fifth mode "M5" (at the time "td"), the controlling circuit "CON" sets the off period "t2" at a period that is longer than the off period "t2" in the fourth mode "M4" while maintaining the on period "t1".

After the time "td" in FIG. 3, the controlling circuit "CON" sets the fifth mode (the minimum current mode) "M5" as the control mode.

The controlling circuit "CON" fixes the on period "t1" and fixes the off period "t2" at a period that is longer than the off period "t2" in the fourth mode "M4".

For example, if the switch element "SW" is turned on, and the detection voltage "SX" (the resistance of the resistor "R" times the value of the current "Id") increases to reach the divided voltage value "Vx" obtained by voltage-dividing the dimming signal "REF", the controlling circuit "CON" turns off the switch element "SW" and then turns on the switch element "SW" when the second off-width modulation period "H2" longer than the first off-width modulation period "H1" elapses after the turning off of the switch element "SW" (FIG. 3).

As described above, in transition from the fifth mode "M5" to the fourth mode "M4", the controlling circuit "CON" sets the off period "t2" at a period that is shorter than the off period "t2" in the fifth mode "M5" while maintaining the on period "t1".

As described above, the controlling circuit "CON" depends only on the dimming signal "REF" externally input to the signal input terminal "TREF" to switch the control mode stepwise among the five modes and control the switching period to output the output current "Io" responsive to the value of the input dimming signal "REF".

In particular, as shown in FIG. 3, the switching frequency that is the inverse of the switching period associated with the fourth dimming rate "x4" in the fifth mode "M5" is set lower than the switching frequency that is the inverse of the switching period associated with the first dimming rate "x1" in the first mode "M1".

As a result, in the fifth mode "M5", in which the switching energy is low, even if the switching frequency comes close to the audio frequency, the switching noise is less audible to human ears because of the low switching energy. On the other hand, in the first mode "M1", in which the switching energy is high, the switching frequency is set higher than the audio frequency, and therefore the switching noise can be made less audible to human ears.

Figure 4:
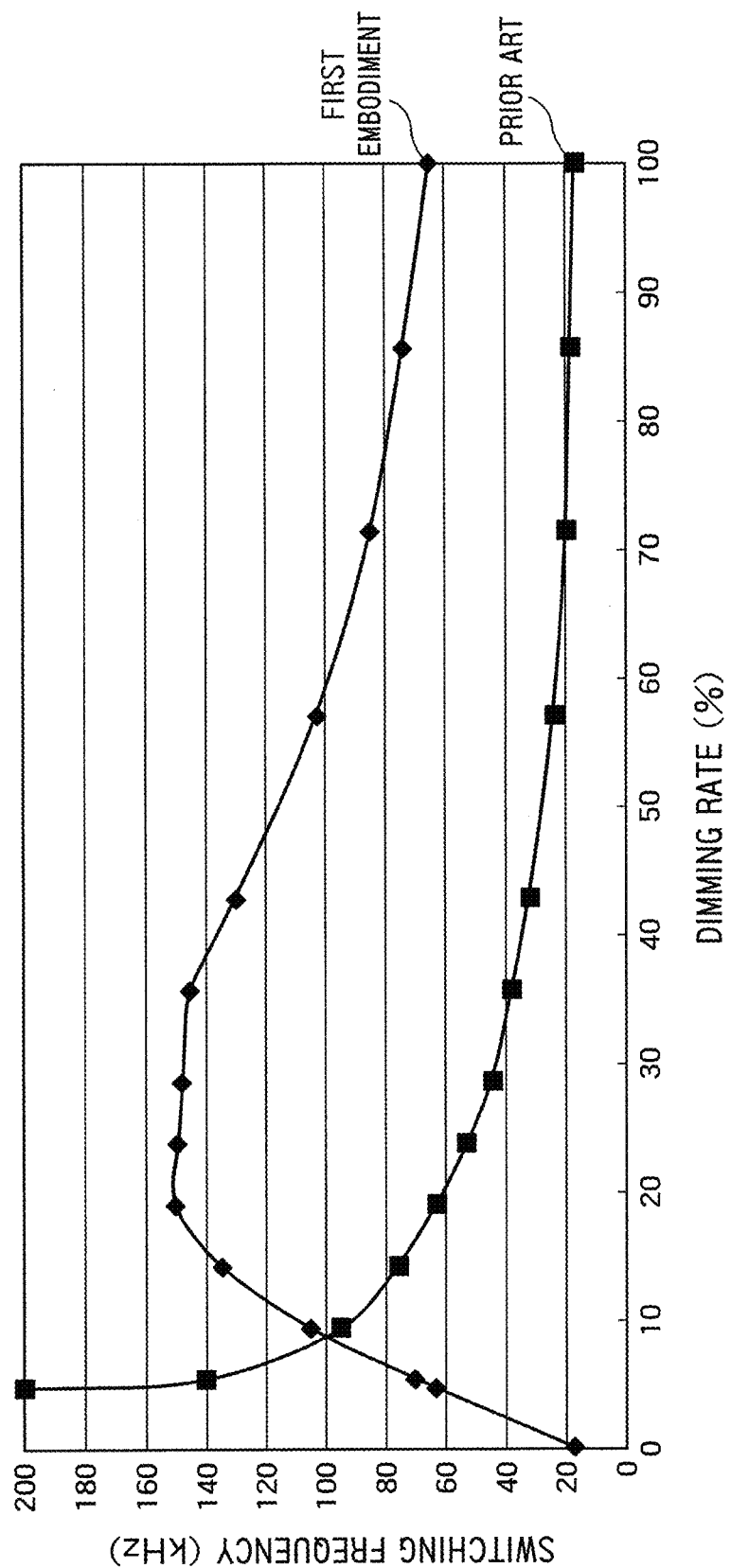
FIG. 4 is a characteristics diagram showing relationships between the dimming rate and the switching frequency for the LED illumination dimming circuit 100 shown in FIG. 1 and the conventional LED illumination dimming circuit.
Figure 5:
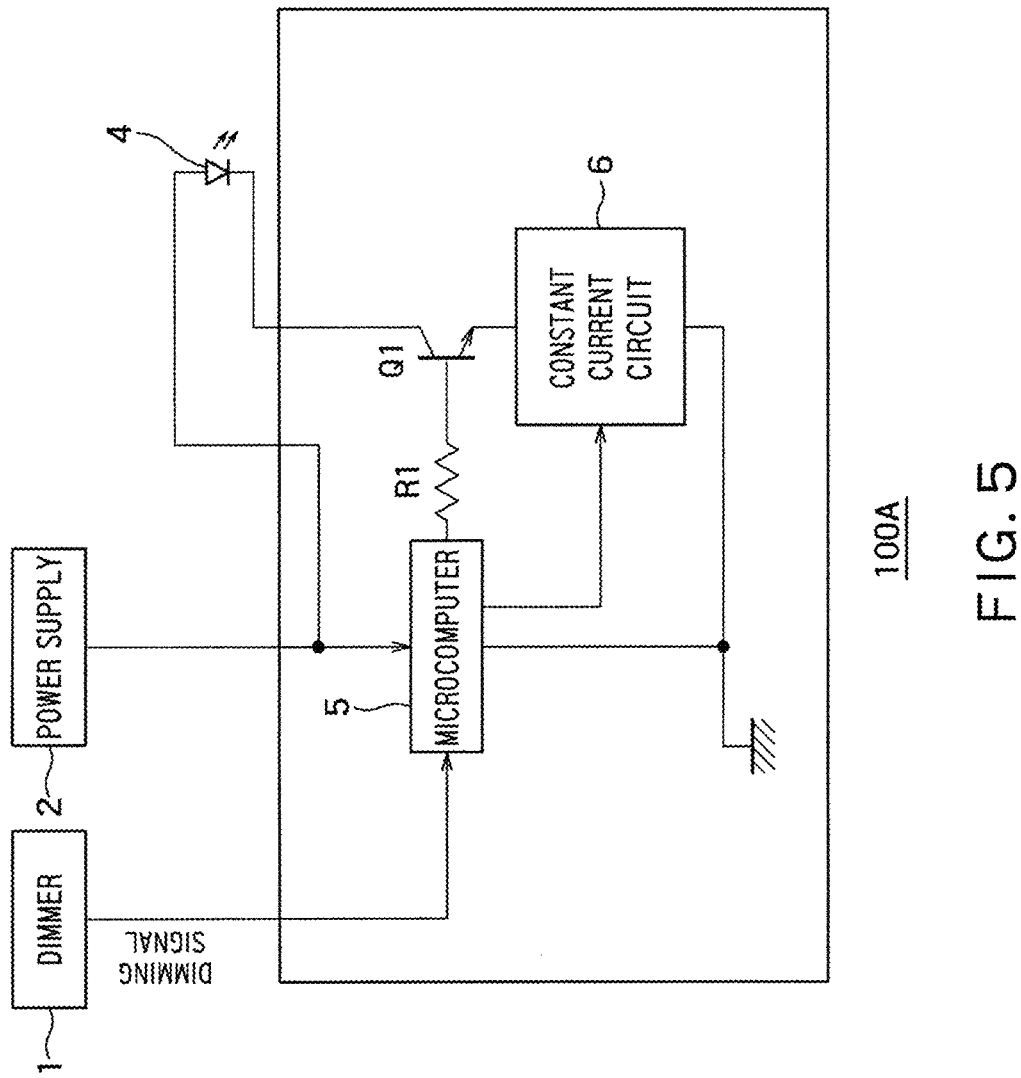
FIG. 5 is a diagram showing an example of a conventional configuration of an LED illumination dimming circuit 100A.

FIG. 4 is a characteristics diagram showing relationships between the dimming rate and the switching frequency for the LED illumination dimming circuit 100 shown in FIG. 1 and the conventional LED illumination dimming circuit.

The conventional LED illumination dimming circuit shown in FIG. 4 uses the frequency modulation mode regardless of the magnitude of the dimming rate. More specifically, the conventional LED illumination dimming circuit reduces the switching period while maintaining the ratio between the on period and the off period when the dimming rate decrease, and increases the switching period while maintaining the ratio between the on period and the off period when the dimming rate increases.

Therefore, the switching frequency is at the maximum (200 kHz or higher) when the dimming rate is close to 0%, and is at the minimum when the dimming rate is close to 100%.

That is, the conventional LED illumination dimming circuit has a switching frequency lower than the audio frequency (20 kHz, for example) when the dimming rate is close to 100% and the switch element requires high energy.

Therefore, the switching noise of the conventional LED illumination dimming circuit is audible to human ears.

In addition, when the dimming rate is close to 0%, the conventional LED illumination dimming circuit has a high switching frequency (200 kHz or higher), so that the efficiency decreases, and it is difficult for the LED illumination dimming circuit to control the switch element.

To the contrary, the LED illumination dimming circuit 100 according to the first embodiment changes the control mode depending on the magnitude of the dimming rate as described above.

Thus, as shown in FIG. 4, the switching frequency is low (about 20 kHz) when the dimming rate is close to 0% (in the fifth control mode), and decreases (to about 60 kHz) as the dimming rate comes close to 100% (in the first control mode). In the example shown in FIG. 4, even the maximum value of the switching frequency is about 150 kHz.

That is, the LED illumination dimming circuit 100 according to the first embodiment can set the switching frequency higher than the audio frequency (60 kHz, for example) when the dimming rate is close to 100% and the switch element requires high energy.

As described above, the LED illumination dimming circuit 100 according to the first embodiment sets the switching frequency higher than the audio frequency (20 kHz, for example) when the dimming rate is at the maximum.

That is, the LED illumination dimming circuit according to the present invention provides the maximum dimming range in a limited frequency range by modulating the off width of the switch element so as to prevent the switching frequency from being too high during dimming.

In addition, the LED illumination dimming circuit 100 according to the first embodiment achieves dimming in the five modes as described above. More specifically, the LED illumination dimming circuit 100 achieves dimming by successively performing the five modes, the maximum current mode in which the LED element is made to emit light with the maximum current, the frequency modulation mode in which dimming is achieved by decreasing the peak current, the off-width fixing mode in which the only the on width is reduced while keeping the off width fixed, the off-width modulation mode in which the on width is reduced while increasing the off width, and the minimum current mode in which the LED element is made to emit light with the minimum current.

In this way, the frequency change range can be reduced by reducing the on width of the switch element and at the same time increasing the off width of the switch element.

In particular, as shown in FIG. 4, the switching frequency that is the inverse of the switching period associated with the fourth dimming rate "x4" in the fifth mode "M5" is set lower than the switching frequency that is the inverse of the switching period associated with the first dimming rate "x1" in the first mode "M1".

As a result, in the fifth mode "M5", in which the switching energy is low, even if the switching frequency comes close to the audio frequency, the switching noise is less audible to human ears because of the low switching energy. That is, when the switching frequency is close to the audio frequency because of the control to reduce the switching frequency when the dimming rate is low (when the light is dark), the current (energy) is at the minimum. On the other hand, in the first mode "M1", in which the switching energy is high, the switching frequency is set higher than the audio frequency, and therefore the switching noise can be made less audible to human ears.

Therefore, a sound caused by switching of the switch element in the LED illumination dimming circuit is less audible to the user.

To the contrary, according to the prior art, the switching frequency is close to the audio frequency when the current (energy) is at the maximum, so that a sound caused by switching of the switch element in the LED illumination dimming circuit is audible to the user (FIG. 4).

As described above, the LED illumination dimming circuit according to the present invention can provide a wide dimming range with a narrow frequency change range.

In particular, the LED illumination dimming circuit according to the present invention can reduce the frequency change while taking advantage of the current critical mode in which the efficiency is high and noise is low.

Furthermore, the LED illumination dimming circuit according to the present invention uses the dimming signal input thereto via one signal input terminal to achieve dimming control and therefore requires a reduced number of terminals to achieve dimming control.

The embodiment described above is given for illustrative purposes, and the scope of the present invention is not limited to the embodiment.

Although a case where the switch element is an MOS transistor has been described in the above embodiment, the switch element may be a bipolar transistor or other elements.

EXPLANATION OF REFERENCES 1 dimmer
2 power supply
4 LED element
5 microcomputer
6 constant current circuit
100, 100A LED illumination dimming circuit
B battery
A LED element
TB power supply terminal
TE ground terminal
TOUT1 first output terminal
TOUT2 second output terminal
C capacitor
L coil
R, R1 resistor
SW switch element
CON controlling circuit
Q1 bipolar transistor
TREF signal input terminal
IS constant current source
DS input diode
DR1 first voltage dividing resistor
DR2 second voltage dividing resistor
COMP three-input comparator
UDO off-timing detecting circuit
ODC on-timing detecting circuit
PGC1 first pulse generating circuit
PGC2 second pulse generating circuit
VIC voltage-current converting circuit
ITC current-time converting circuit
OC AND circuit
SX detection voltage
Vx divided voltage value
X first node
Y second node
V100 comparative voltage

The invention claimed is:

1. An LED illumination dimming circuit that controls dimming of an LED element, comprising:
a power supply terminal to which a power supply voltage is supplied;
a ground terminal connected to a ground;
a first output terminal that is connected to the power supply terminal and to which an anode side of the LED element is connected;
a second output terminal to which a cathode side of the LED element is connected;
a capacitor connected to the first output terminal at a first end thereof and to the second output terminal at a second end thereof;
a coil connected to the second end of the capacitor at a first end thereof;
a switch element connected to a second end of the coil at a first end thereof;
a resistor connected to a second end of the switch element at a first end thereof and to the ground terminal at a second end thereof;
a diode connected to the power supply terminal at a cathode thereof and to the second end of the coil at an anode thereof; and
a controlling circuit that controls an operation of the switch element with a switch controlling signal depending on a dimming signal that indicates a dimming rate of the LED element, a detection voltage responsive to a voltage drop in the resistor and a detection current flowing through the coil,
wherein the controlling circuit
fixes a switching period, which consists of an on-period in which the switch element is turned on and an off-period in which the switch element is turned off, in a first mode in which the dimming signal indicates a first dimming rate,
reduces the switching period while maintaining a ratio between the on-period and the off-period when the dimming rate indicated by the dimming signal decreases in a second mode in which the dimming signal indicates a dimming rate in a first dimming section from the first dimming rate to a second dimming rate lower than the first dimming rate,
reduces the on-period while keeping the off-period fixed when the dimming rate indicated by the dimming signal decreases in a third mode in which the dimming signal indicates a dimming rate in a second dimming section from the second dimming rate to a third dimming rate lower than the second dimming rate,
increases the off-period while reducing the on-period when the dimming rate indicated by the dimming signal decreases in a fourth mode in which the dimming signal indicates a dimming rate in a third dimming section from the third dimming rate to a fourth dimming rate lower than the third dimming rate, fixes the on-period and fixes the off-period at a period that is longer than the off-period in the fourth mode in a fifth mode in which the dimming signal indicates the fourth dimming rate, determines that a control mode of the LED illumination dimming circuit is the first mode if a value of the dimming signal is equal to or higher than a first threshold, and determines that the control mode is the second mode if the value of the dimming signal is equal to or higher than a second threshold lower than the first threshold and is lower than the first threshold.

2. The LED illumination dimming circuit according to claim 1, wherein in the first mode, the controlling circuit
turns off the switch element when the detection voltage increases to reach a preset comparative voltage as a result of turning on of the switch element and then turns on the switch element when a current flowing through the coil decreases to zero as a result of the turning off of the switch element.

3. The LED illumination dimming circuit according to claim 1, wherein in the second mode, the controlling circuit
turns off the switch element when the detection voltage increases to reach a divided voltage value obtained by voltage-dividing the dimming signal as a result of turning on of the switch element and then turns on the switch element when a current flowing through the coil decreases to zero as a result of the turning off of the switch element.

4. The LED illumination dimming circuit according to claim 1, wherein in the third mode, the controlling circuit
turns off the switch element when the detection voltage increases to reach a divided voltage value obtained by voltage-dividing the dimming signal as a result of turning on of the switch element and then turns on the switch element when an off-width fixing period elapses after the turning off of the switch element.

5. The LED illumination dimming circuit according to claim 1, wherein in the fourth mode, the controlling circuit
turns off the switch element when the detection voltage increases to reach a divided voltage value obtained by voltage-dividing the dimming signal as a result of turning on of the switch element and then turns on the switch element when a first off-width modulation period, which varies with the value of the dimming signal and is longer than the off-width fixing period, elapses after the turning off of the switch element.

6. The LED illumination dimming circuit according to claim 5, wherein in the fifth mode, the controlling circuit
turns off the switch element when the detection voltage increases to reach a divided voltage value obtained by voltage-dividing the dimming signal as a result of turning on of the switch element and then turns on the switch element when a second off-width modulation period, which is longer than the first off-width modulation period, elapses after the turning off of the switch element.

7. The LED illumination dimming circuit according to claim 1, wherein in the second mode, the controlling circuit
increases the switching period while maintaining the ratio between the on-period and the off-period when the dimming rate indicated by the dimming signal increases.

8. The LED illumination dimming circuit according to claim 1, wherein in the third mode, the controlling circuit
increases the on-period while keeping the off-period fixed when the dimming rate indicated by the dimming signal increases.

9. The LED illumination dimming circuit according to claim 1, wherein in the fourth mode, the controlling circuit
reduces the off-period while increasing the on-period when the dimming rate indicated by the dimming signal increases.

10. The LED illumination dimming circuit according to claim 1, wherein the controlling circuit comprises:
a signal input terminal to which the dimming signal is input;
a constant current source having a first end to which an internal power supply voltage is supplied;
an input diode connected to a second end of the constant current source at an anode thereof and to the signal input terminal at a cathode thereof;
a first voltage-dividing resistor connected to the signal input terminal at a first end thereof;
a second voltage-dividing resistor connected to a second end of the first voltage-dividing resistor at a first end thereof and to the ground at a second end thereof;
a three-input comparator that has a non-inverting input terminal that is connected to the first end of the resistor and to which the detection voltage is input, a first inverting input terminal that is connected to the second end of the first voltage-dividing resistor and to which a divided voltage value obtained by voltage-dividing the dimming signal is input and a second inverting input terminal to which a comparative voltage is input, outputs a signal responsive to a result of comparison between the comparative voltage and the detection voltage if the divided voltage value is equal to or higher than the comparative voltage and outputs a signal responsive to a result of comparison between the divided voltage value and the detection voltage if the divided voltage value is lower than the comparative voltage;
an off-timing detecting circuit that outputs an impulse-like off signal when it is detected based on the signal output from the three-input comparator that the detection voltage reaches the comparative voltage or the divided voltage value;
an on-timing detecting circuit that is connected to the second end of the coil at an input thereof and outputs an impulse-like on signal when a current flowing through the coil becomes zero;
a first pulse generating circuit that receives the off signal and the on signal and outputs a first pulse signal that rises at a timing of the on signal and falls at a timing of the off signal;
a second pulse generating circuit that outputs a second pulse signal based on the value of the dimming signal; and
an AND circuit that performs an AND operation of the first pulse signal and the second pulse signal and outputs a result of the operation as the switch controlling signal, and
the second pulse generating circuit
fixes a pulse width and a pulse interval of the second pulse signal if the value of the dimming signal is equal to or higher than the first threshold,
reduces the pulse width and fixes the pulse interval according to the decrease of the value of the dimming signal if the value of the dimming signal is lower than the first threshold and equal to or higher than a third threshold,
reduces the pulse width and increases the pulse interval according to the decrease of the value of the dimming signal if the value of the dimming signal is lower than the third threshold and equal to or higher than a fourth threshold, and fixes the pulse width and increases the pulse interval according to the decrease of the value of the dimming signal if the value of the dimming signal is lower than the fourth threshold.

11. The LED illumination dimming circuit according to claim 1, wherein a switching frequency that is an inverse of the switching period associated with the first dimming rate in the first mode is higher than an audio frequency.

12. The LED illumination dimming circuit according to claim 11, wherein a switching frequency that is an inverse of the switching period associated with the fourth dimming rate in the fifth mode is lower than the switching frequency that is the inverse of the switching period associated with the first dimming rate in the first mode.

13. A LED illumination dimming method by a LED illumination dimming circuit that comprises a power supply terminal to which a power supply voltage is supplied; a ground terminal connected to a ground; a first output terminal that is connected to the power supply terminal and to which an anode side of the LED element is connected; a second output terminal to which a cathode side of the LED element is connected; a capacitor connected to the first output terminal at a first end thereof and to the second output terminal at a second end thereof; a coil connected to the second end of the capacitor at a first end thereof; a switch element connected to a second end of the coil at a first end thereof; a resistor connected to a second end of the switch element at a first end thereof and to the ground terminal at a second end thereof; a diode connected to the power supply terminal at a cathode thereof and to the second end of the coil at an anode thereof; and a controlling circuit that controls an operation of the switch element with a switch controlling signal depending on a dimming signal that indicates a dimming rate of the LED element, a detection voltage responsive to a voltage drop in the resistor and a detection current flowing through the coil, wherein the controlling circuit fixes a switching period, which consists of an on-period in which the switch element is turned on and an off-period in which the switch element is turned off, in a first mode in which the dimming signal indicates a first dimming rate, reduces the switching period while maintaining a ratio between the on-period and the off-period when the dimming rate indicated by the dimming signal decreases in a second mode in which the dimming signal indicates a dimming rate in a first dimming section from the first dimming rate to a second dimming rate lower than the first dimming rate, reduces the on-period while keeping the off-period fixed when the dimming rate indicated by the dimming signal decreases in a third mode in which the dimming signal indicates a dimming rate in a second dimming section from the second dimming rate to a third dimming rate lower than the second dimming rate, increases the off-period while reducing the on-period when the dimming rate indicated by the dimming signal decreases in a fourth mode in which the dimming signal indicates a dimming rate in a third dimming section from the third dimming rate to a fourth dimming rate lower than the third dimming rate, fixes the on-period and fixes the off-period at a period that is longer than the off-period in the fourth mode in a fifth mode in which the dimming signal indicates the fourth dimming rate, determines that a control mode of the LED illumination dimming circuit is the first mode if a value of the dimming signal is equal to or higher than a first threshold, and determines that the control mode is the second mode if the value of the dimming signal is equal to or higher than a second threshold lower than the first threshold and is lower than the first threshold.

* * * * *